US006550314B2

(12) United States Patent
Summers et al.

(10) Patent No.: US 6,550,314 B2
(45) Date of Patent: Apr. 22, 2003

(54) APPARATUS AND METHOD FOR ON-LINE DETECTION OF LEAKY VALVES

(75) Inventors: Angela E. Summers, Houston, TX (US); Bryan A. Zachary, Alvin, TX (US)

(73) Assignee: SIS-Tech Applications, L.L.P., Houston, TX (US)

( * ) Notice: Subject to any disclaimer, the term of this patent is extended or adjusted under 35 U.S.C. 154(b) by 0 days.

(21) Appl. No.: 09/811,735

(22) Filed: Mar. 19, 2001

(65) Prior Publication Data

US 2002/0129640 A1 Sep. 19, 2002

(51) Int. Cl.[7] .............................................. G01M 3/08
(52) U.S. Cl. ........................................ 73/46; 137/312
(58) Field of Search ................................. 73/46, 47, 40, 73/40.5 A; 137/312, 15.11, 551

(56) References Cited

U.S. PATENT DOCUMENTS

| | | | | |
|---|---|---|---|---|
| 3,320,801 A | * | 5/1967 | Rhindress, Jr. ................ | 73/116 |
| 3,398,761 A | * | 8/1968 | Grove et al. ................. | 137/312 |
| 4,043,355 A | * | 8/1977 | Cerruti et al. ............... | 137/312 |
| 4,573,344 A | * | 3/1986 | Ezekoye ........................ | 73/46 |
| 4,901,751 A | * | 2/1990 | Story et al. .................. | 137/312 |
| 4,916,938 A | * | 4/1990 | Aikin et al. .................... | 73/46 |
| 5,546,977 A | * | 8/1996 | Chaney ........................ | 137/312 |
| 5,616,829 A | * | 4/1997 | Balaschak et al. ............. | 73/46 |
| 5,979,227 A | * | 11/1999 | Lawson et al. ................ | 73/46 |
| 6,128,946 A | | 10/2000 | Leon et al. ..................... | 73/46 |
| 6,134,949 A | * | 10/2000 | Leon et al. ............... | 73/40.5 A |

* cited by examiner

Primary Examiner—Hezron Williams
Assistant Examiner—C D Garber
(74) Attorney, Agent, or Firm—Raymond R. Ferrera; Intellectual Property Services

(57) ABSTRACT

An apparatus and method for simply and economically detecting leaks in a isolation valve disposed in an on-line fluid transport system having at least an upstream pipe and a downstream pipe is provided, the apparatus comprising a isolation valve connected between the upstream pipe and downstream pipe for isolating fluid flow through the transport system; wherein the isolation valve includes at least one upstream seal, one downstream seal, and an inner cavity effectively isolated from the fluid flow by the seals. The apparatus further comprises a pressure sensor and a vent valve, wherein the vent valve is in fluid communication with the isolation valve's inner cavity to permit venting of process pressure accumulated within the inner cavity to an external environment when the vent valve is opened; and wherein when the vent valve is closed, the pressure sensor will measure a resulting difference in fluid pressure within the cavity, the pressure difference being indicative of the integrity of the upstream and downstream seals. The present invention also provides a method of employing the apparatus in association with commercial and industrial fluid transport systems wherein the inner cavity can be vented under full on-line process pressure.

11 Claims, 3 Drawing Sheets

APPARATUS AND METHOD FOR ON-LINE DETECTION OF LEAKY VALVES

CROSS-REFERENCE TO RELATED APPLICATIONS

Not Applicable

STATEMENT REGARDING FEDERALLY SPONSORED DEVELOPMENT

Not Applicable

BACKGROUND OF THE INVENTION

1. Field of the Invention

The present invention relates generally to the testing of the sealing capability of isolation valves in commercial and industrial fluid transport systems, and more particularly to an apparatus and method for simply and economically detecting leaky valves while the transport system remains on-line.

2. Background of the Invention

In many commercial and industrial fluid transport systems, isolation valves are employed as a defense against the incremental development of hazardous operating conditions. As a result of their simple design, these valves are generally maintained in either an open or closed position for the majority of their operational lives; the particular operational position depends primarily upon the process environment in which the valve is employed. Such isolation valves, unlike more sophisticated modulating control valves, which can be monitored and diagnosed for fluid leakage by periodic comparison of the valve position and the flow rate within the fluid path in which the valve is disposed, can generally be monitored and diagnosed while the fluid transport system remains on-line by either of the following previously known methods:

First, high frequency acoustical systems can be used to identify leaky valves under certain process conditions. For example, on-line detection of leaks can be effected using high frequency acoustics when a monitored isolation valve is set in a closed position and a significant pressure gradient exists within the valve along the directional axis of the flow path. One or more pressure sensors can then be used to "listen" for high frequency noise created by valve leakage.

One drawback to such a configuration is that, since the valve must first be completely closed in order to monitor or diagnosis fluid leakage, process performance of the entire system is effectively impeded for the duration of each of the respective functions. Moreover, since a significant pressure gradient must exist across the valve in order for a leak to be detected by the sensors, minor leaks may go undetected during a given testing cycle, and only later become apparent, perhaps after a significant escalation of hazardous process conditions has already occurred, or even after the valve has failed entirely. Finally, since valves in which only one of several seals has failed will not generally exhibit a significant pressure gradient along the flow path, partially leaky valves can also go undetected for some time.

As seen in U.S. Pat. No. 6,128,946 to Leon et al., on-line detection of leaks may also be accomplished using a system in which a series of pulsations within the transport system (caused by fluid vibrations) are compared to pulsations occurring within a valve's inner cavity as a function of time. Such a configuration requires disposition of at least two pressure sensors, one located within the system's flow path at a predetermined position either upstream or downstream relative to the valve, and another within the valve's inner cavity. The pulsations measured by the sensors can then be used to determine whether the sensed pressure pulsations within the transport system are being passed through at least one of the seals into the valve's inner cavity, thereby revealing the presence of leaky seals within the valve.

However, since the system taught by Leon et al. also requires, at minimum, a plurality of transducers, an analyzer to perform pulsation comparisons, and an appropriate transport system process connection disposed within a relatively close proximity of the valve to function effectively, those of ordinary skill in the art have found the configuration to be unnecessarily cumbersome and expensive, and of limited application in transport systems having an unusually complex geometry.

Finally, leaky valves may also be detected by applying an external pressure source directly to the isolation valve's inner cavity; an operator or other maintenance personnel can then directly measure the leak rate into the valve and assess the integrity of the seals. Those of skill in the art have also found this approach dissatisfactory, however, since the fluid transport system must first be taken off-line to perform either testing or maintenance (because internal process pressures on the valve must be interrupted to determine whether the seals are leaking back into the flow path), and both an external source of pressure and additional operational personnel are required.

Accordingly, it is apparent there is a widespread need for a method and apparatus for simply and economically detecting leaky valves while a fluid transport system remains continuously on-line.

3. Objects of the Invention

In view of the foregoing, an object of the present invention is to provide an apparatus for detecting leaky valves in a commercial or industrial fluid transport system, the apparatus comprising a valve body having at least an inner cavity isolated by a plurality of seals; a vent port; a pressure sensor; a vent valve; and an exit vent, wherein the inner cavity can be pressurized and vented to an external environment under full online process pressure.

A further object of the invention is to provide a method for simply and economically testing the integrity of a valve seal in an on-line fluid transport system, wherein the method comprises first venting the contents of a isolation valve's inner cavity to an external environment, and then comparing the vented inner cavity pressure to the ambient pressure of the external environment to determine whether the valve's seals have been compromised.

BRIEF SUMMARY OF THE INVENTION

An apparatus for on-line testing of isolation valves in fluid transport systems is provided comprising an upstream pipe; a downstream pipe; and a isolation valve connected therebetween for isolating fluid flow through the transport system; wherein the isolation valve has at least one upstream seal, one downstream seal, and an inner cavity effectively isolated from the fluid flow by the seals. The apparatus further comprises a pressure sensor and a vent valve, wherein the vent valve is in fluid communication with the apparatus' inner cavity to permit venting of the fluid to an external environment when the vent valve is opened, and the pressure sensor measures a resulting difference in fluid pressure within the cavity when the vent valve is closed, said pressure difference being indicative of the integrity of the upstream and downstream seals.

The present invention also provides a method of employing the claimed apparatus in commercial and industrial fluid transport systems wherein the inner cavity can be vented under full on-line process pressure in a manner such that an observer (or a data processor) can determine whether the integrity of the valve seals has been compromised.

DETAILED DESCRIPTION OF THE INVENTION

Figure 1:
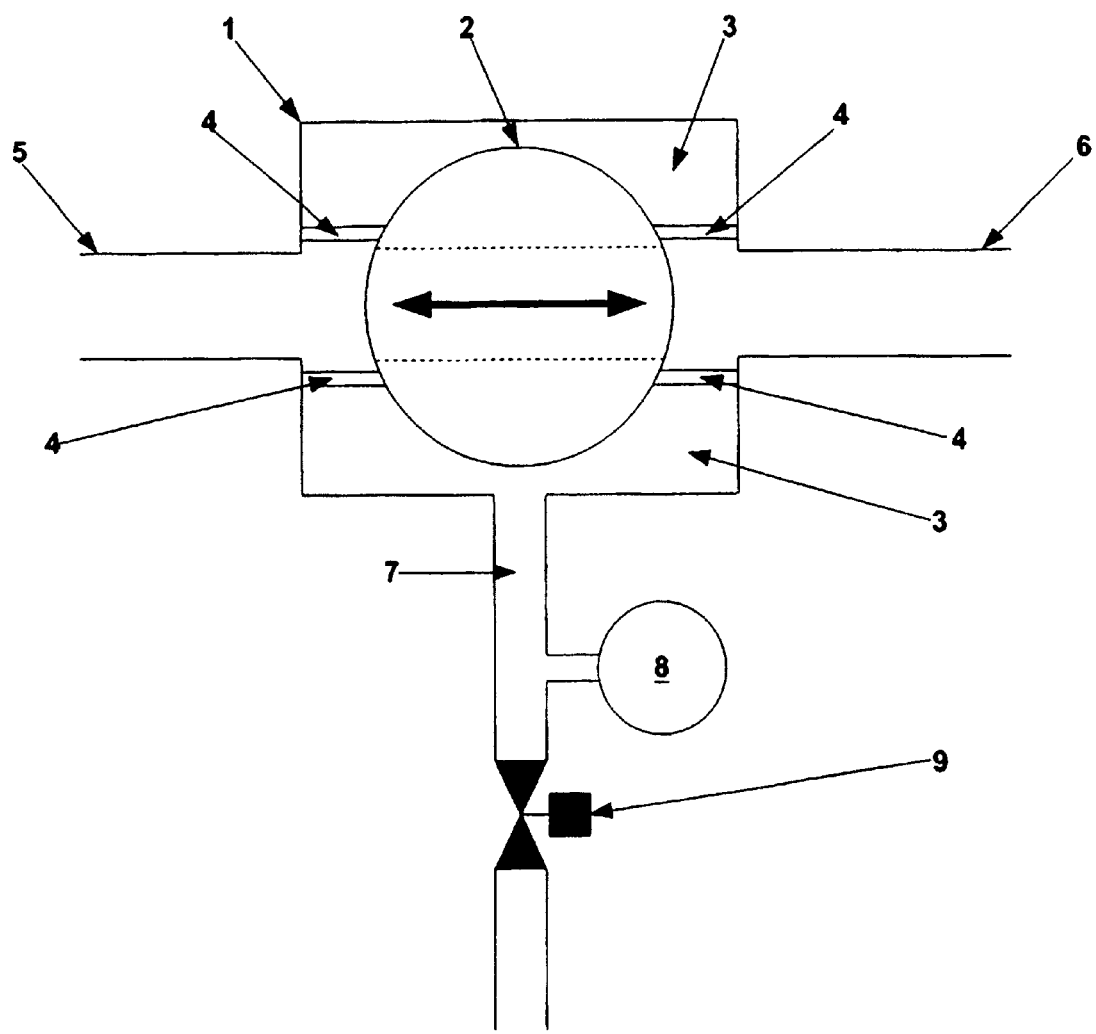
FIG. 1 depicts an embodiment of the present invention wherein an open isolation valve is disposed in fluid communication with an on-line process stream, and a vent valve for venting process pressure accumulated in an inner cavity of the isolation valve is set in the closed position.

Referring now to FIG. 1, an isolation valve according to one aspect of the present invention is provided, wherein the isolation valve comprises a valve body 1, a trunnion-type valve ball 2, an inner cavity 3, a plurality of valve seals 4, and a vent port 7. When the isolation valve is used in conjunction with a commercial or industrial fluid transport system having an upstream pipe 5 and a downstream pipe 6, process pressure is directed from the upstream pipe 5 to the downstream pipe 6 across valve ball 2 in a manner such that the directional axis of the flow path remains substantially parallel to the directional axes of upstream pipe 5 and downstream pipe 6 throughout the fluid transport process.

The vent port 7 is generally, although not necessarily, mechanically attached to the valve body 1. Vent port 7 remains in fluid communication with at least one pressure sensor 8 so that fluid pressure within the vent port can be measured by means of the pressure sensor.

According to a further aspect of the invention, the vent port 7 terminates with a vent valve 9, said vent valve also being mechanically attached to vent port 7. Vent valve 9 must be capable of being maintained in either an opened or closed position, and a joining portion should be adapted to snugly fit the geometry of an outermost terminus point of vent port 7. The portion of vent valve 9 which directs process pressure away from the valve body 1 must also be in fluid communication with an exit vent 10 in a manner such that process pressure accumulated in the isolation valve's inner cavity 3 may be vented to an external environment by means of a natural vacuum effect created through the body of vent port 7 and vent valve 9.

Figure 2:
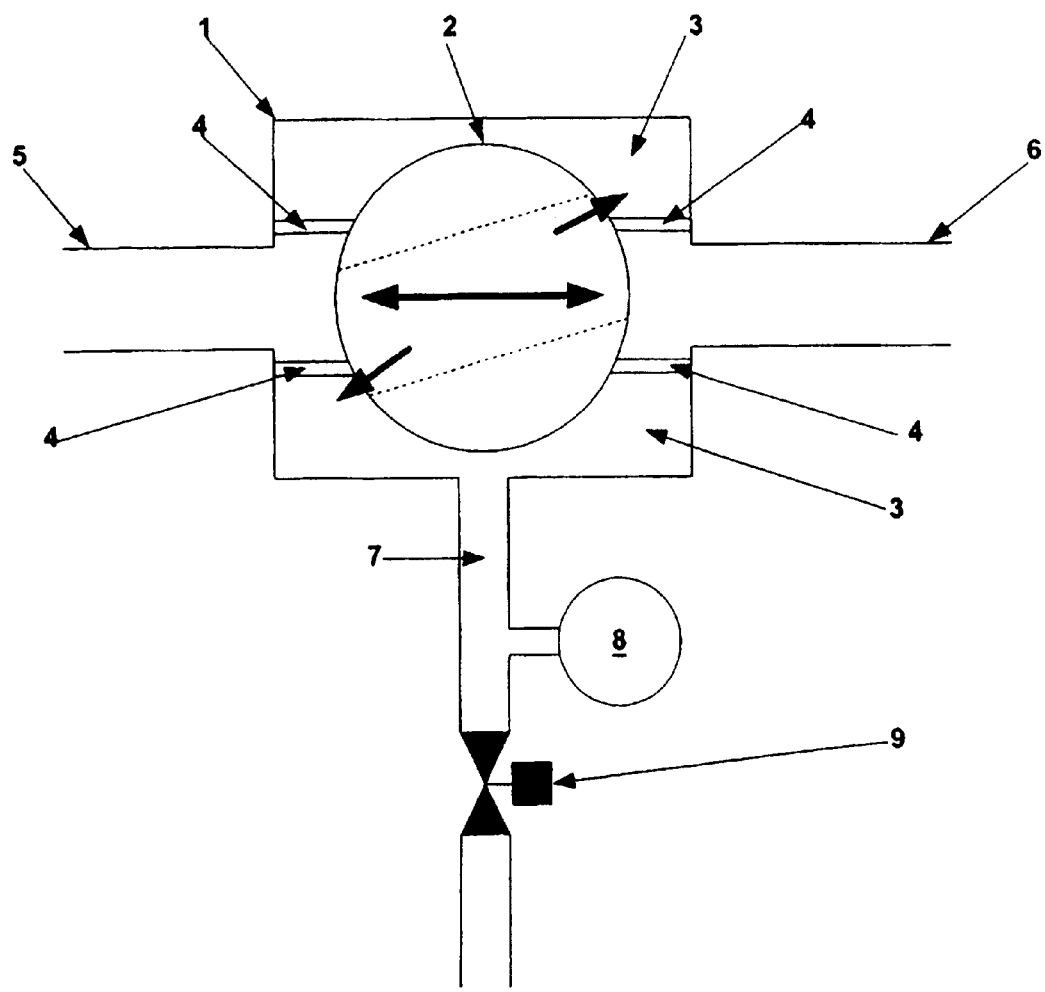
FIG. 2 depicts an embodiment of the invention wherein the isolation valve is partially closed so as to admit process pressure directly into the isolation valve's inner cavity, while the vent valve remains closed so as to permit accumulation of the process pressure within the confines of the cavity.

In FIG. 2, the isolation valve has been partially closed by rotating valve ball 2 in such a manner that process pressure is allowed to accumulate within the valve's inner cavity 3. In order to effectively permit accumulation of process pressure within the valve's inner cavity while the fluid transport system remains on-line, the angular rotational sweep of valve ball 2 should be sufficiently large enough to permit process pressure to bypass the plurality of valve seals 4, but small enough that the directional axis of the fluid flow path through valve ball 2 remains substantially parallel to the directional axis of the fluid transport system (for example, by rotating the valve ball 30 degrees or less). Absent such conditions, the device cannot be effectively employed while the transport system remains fully operational, since the flow rate of the system is likely to be significantly interrupted as a result of the roiling currents created within the process flow path. According to this aspect of the invention, vent valve 9 remains closed as process pressure is allowed to accumulate within the valve's inner cavity 3. Accordingly, no process pressure is vented to the external environment during this stage of the valve's operation.

Figure 3:
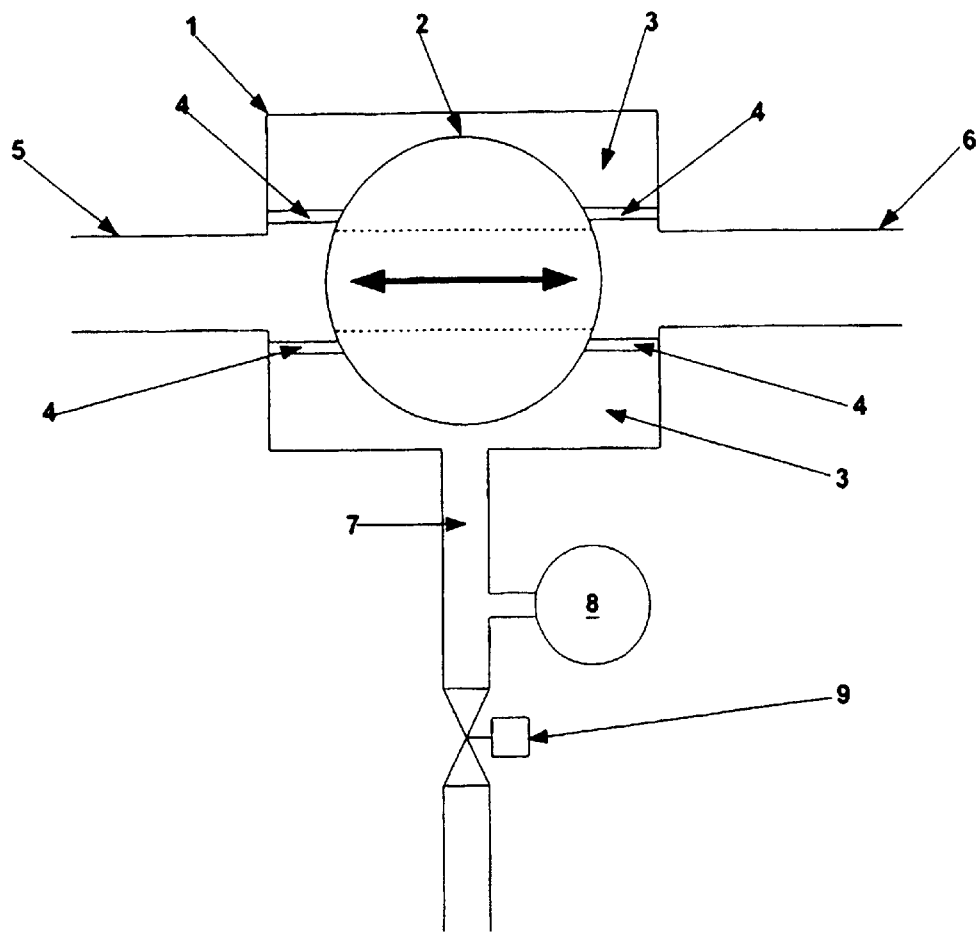
FIG. 3 depicts an embodiment of the invention wherein the isolation valve is returned to a fully opened position so as to again isolate the isolation valve's inner cavity from process pressure, and the vent valve is opened to permit venting of process pressure accumulated within the cavity to an external environment by means of a vent port.

As seen in FIG. 3, valve ball 2 is then rotated back to its original position, so that the valve's inner cavity 3 is again isolated from process pressure by the plurality of seals 4. Those of ordinary skill in the art will appreciate that the plurality of seals 4 may be formed from a variety of materials, for example hard rubber, plastic, composite material, or metal, but must in any event be capable of substantially isolating the valve's inner cavity 3 from process pressure when the flow path through the valve ball 2 is aligned in its normal operating position.

According to a still further aspect of the invention, vent valve 9 is then quickly, though only briefly, opened such that the process pressure accumulated within the valve's inner cavity 3 may be vented to an external environment via exit port 10.

Finally, as again seen in FIG. 1, vent valve 9 is closed, while the isolation valve remains open so as to permit continuous on-line operation of the fluid transport system. At this point, fluid pressure within the valve's inner cavity should have achieved approximate equilibrium with respect to the ambient fluid pressure of the external environment. Such equilibrium within the inner cavity 3 can be confirmed by means of the pressure sensor 8. To the extent pressure sensor 8 indicates that fluid pressure within the inner cavity 3 differs from the fluid pressure of the external environment, an observer (or data processor) can conclude that one or more of the plurality of seals 4 are leaking. Since in practice no isolation valve can ever be completely leak proof, each valve is assigned a predetermined acceptable leak rate. If pressure sensor 8 indicates fluid pressure within the inner cavity 3 has risen to a pressure approaching the on-line flow pressure faster than would be expected given a particular valve's predetermined acceptable leak rate, the observer (or data processor) can conclude the integrity of the seals has eroded such that they no longer effectively seal the valve. At this point, either the seals or the entire valve must be replaced.

As previously mentioned, the beneficial aspects of the present invention may also be realized by replacing the trunnion-type valve ball 2 with any valve that is constructed such that process pressure accumulated within the valve's inner cavity can be effectively isolated from the flow path of the transport system during venting of the accumulated process pressure, such as, for example, an expansion gate-type valve.

The foregoing specification is provided for illustrative purposes only, and is not intended to describe all possible aspects of the present invention. Moreover, while the invention has been shown and described in detail with respect to several exemplary embodiments, those of ordinary skill in the pertinent arts will appreciate that minor changes to the description, and various other modifications, omissions and additions may also be made without departing from either the spirit or scope thereof.

Having herein described the general nature and characteristics of the invention, what is claimed is:

1. A method for detecting leaky valves in a fluid transport system wherein said fluid transport system includes at least an upstream pipe and a downstream pipe; an isolation valve; a pressure sensor; a vent valve; and an exit vent;

and wherein said isolation valve further comprises a valve body; a fluid flow diversion means; a plurality of seals; and a vent port;

the method for detecting leaky valves comprising:

partially closing said isolation valve by moving said fluid flow diversion means to a position such that said plurality of seals no longer effectively isolates process pressure from said inner cavity, thereby causing diverted process pressure to accumulate within said inner cavity;

returning said isolation valve to a fully opened position by moving said fluid flow diversion means such that said inner cavity is again isolated from said fluid flow by said plurality of seals, thereby effectively isolating said accumulation of process pressure in said inner cavity;

opening said vent valve so that the accumulated process pressure isolated within said inner cavity is vented to an external environment;

closing said vent valve; and then monitoring the resulting inner cavity pressure for a predetermined time period using a pressure sensor to determine a leak rate indicative of fluid re-pressurization within said inner cavity as a function of time.

2. The method for detecting leaky valves in a fluid transport system of claim 1, wherein said fluid flow diversion means comprises a ball rotatably disposed within said isolation valve.

3. The method for detecting leaky valves in a fluid transport system of claim 1, wherein said fluid flow diversion means comprises a gate disposed within said isolation valve.

4. The method for detecting leaky valves in a fluid transport system of claim 1, wherein said plurality of seals are provided for isolating process fluid from said inner cavity.

5. The method for detecting leaky valves in a fluid transport system of claim 4, wherein said plurality of seals are formed from rubber.

6. The method for detecting leaky valves in a fluid transport system of claim 4, wherein said plurality of seals are formed from metal.

7. The method for detecting leaky valves in a fluid transport system of claim 4, wherein said plurality of seals are formed from plastic.

8. The method for detecting leaky valves in a fluid transport system of claim 4, wherein said plurality of seals are formed from composite material.

9. The method for detecting leaky valves in a fluid transport system of claim 1, wherein said vent port is formed structurally integral with said isolation valve.

10. The method for detecting leaky valves in a fluid transport system of claim 1, wherein said vent port is mechanically attached to said isolation valve.

11. The method for detecting leaky valves in a fluid transport system of claim 1, wherein a joining portion of said vent valve is adapted to snugly fit the geometry of an outermost terminus point of said vent port.

* * * * *